Dec. 4, 1956 A. F. REID 2,772,953
PROCESS OF CONCENTRATING
Filed Jan. 13, 1954 2 Sheets-Sheet 1
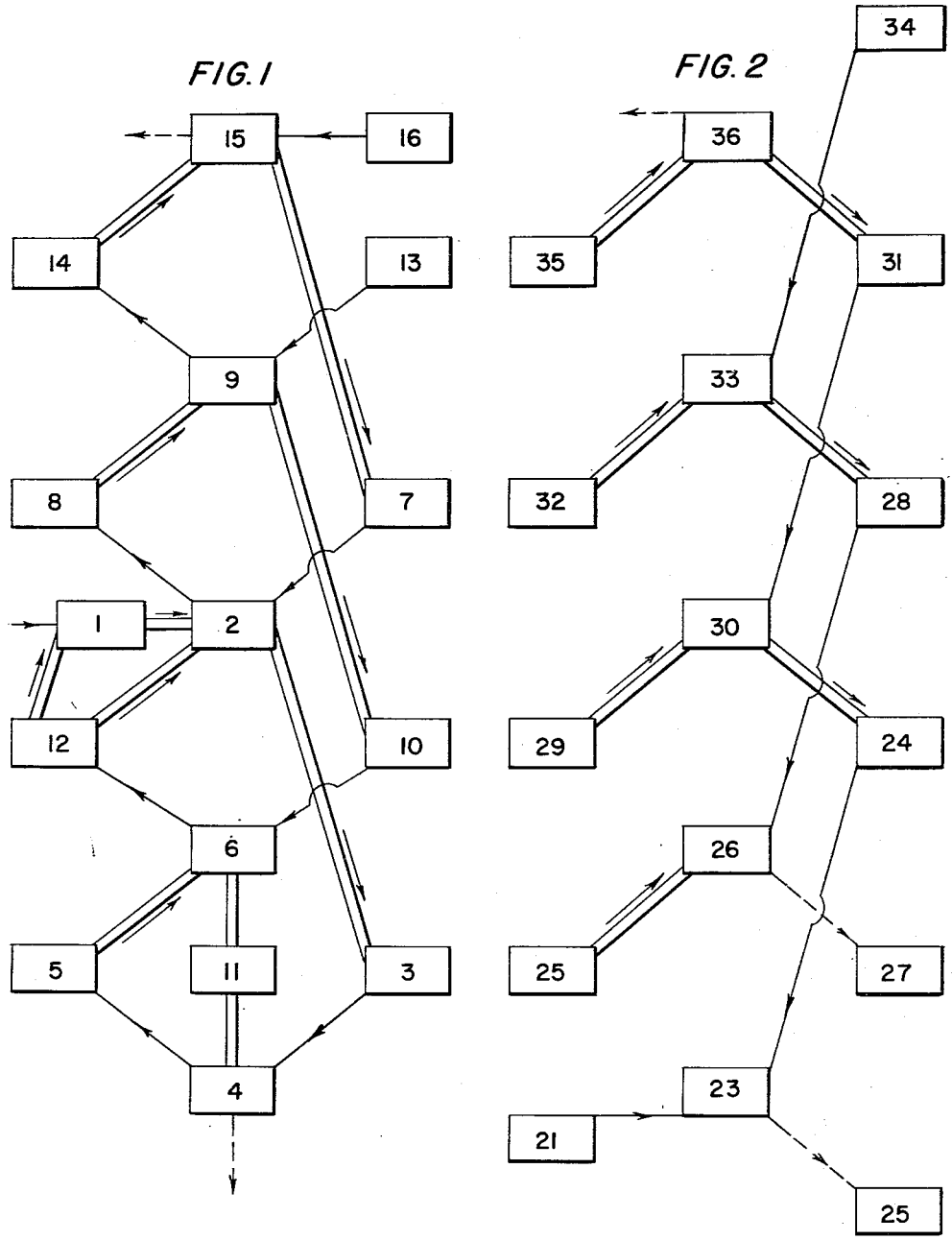
INVENTOR.
ALLEN F. REID
BY Frank A. Bauer
ATTORNEY Dec. 4, 1956  A. F. REID  2,772,953
PROCESS OF CONCENTRATING
Filed Jan. 13, 1954  2 Sheets-Sheet 2

INVENTOR.
Allen F. Reid
BY
Frank A. Bauer
Atty.

# omitted header 2,772,953

PROCESS OF CONCENTRATING

Allen F. Reid, Dallas, Tex.

Application January 13, 1954, Serial No. 403,862

2 Claims. (Cl. 23—311)

This invention relates to the relative concentration of one or more of the constituents of a mixture.

The object of the invention is to provide a process subjecting the mixture to a series of similar reactions or treatments to progressively increase the proportionate amount of an ingredient of the mixture while at the same time retaining the said ingredients against loss in the discards of the remaining ingredients.

It is a further object of the invention to provide a method of relative concentration employing a series of stages with a recycling and reconditioning of intermediate products of the stages to increase the final yield of the desired material in simple and efficient manner.

In the following description

Fig. 1 is a flow diagram of a separation process;

Fig. 2 is a flow diagram of the concentration of radium in barium.

Figure 4:
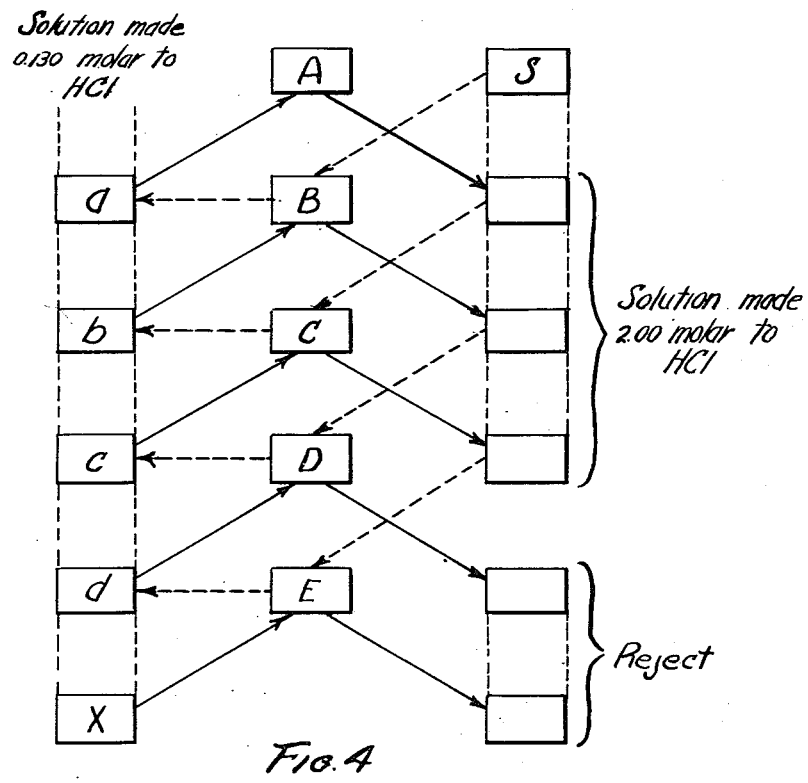

In general, the mechanism of this process is the removal of one substance A from another B or a number of substances B, C, etc. at a greater rate or in a greater proportion than the other or others. Then, after drawing off the unremoved part B, recovering the removed part A and subjecting it, A, to a second preferential removal, $A^1$ from $B^1$. Extracting the unremoved portion $B^1$ from the second preferential removal, recovering the removed part $A^1$ for a third preferential removal. Then taking the unremoved part $B^{11}$ from a subsequent preferential removal $A^{11}$ from $B^{11}$ and adding it to the removed part $B^1$ from a previous preferential removal for recycling through an intermediate preferential removal.

By the progressive variation of the proportions of the ingredients in a series of separate treatments and recirculation to each of these treatments of the discard from the separation treatment applied to material previously enriched by the treatment step receiving the recirculated discard. The discards are thus fed back and used in the system for regeneration of the absorber obtaining an economy which is basically applicable to any preferential absorber system. A particular specific feature contributing to the efficiency of the recycling is the taking back of the unabsorbed effluent and mixing it with the recovered concentrate from a stage more than one stage back of the stage from which the unabsorbed effluent came.

One method for obtaining separation as disclosed by this invention is the formation of the substances to be separated into ions, one of which is preferentially absorbed by a suitable absorber. Fig. 1 is a diagrammatical illustration of a section of a cation-exchange resin absorption system. The system which is run continuously is composed of absorption cells 4, 6, 2, 9 and 15 containing an ion-exchange resin and accessory acidifying cells 3, 10, 7 and 13 and accessory deacidifying cells 5, 12, 8 and 14. Two sets of pipe lines connect the cells and are valved to alternate the flow through the absorption cells. Two types of pipe lines are shown. In the first phase the mixture is run through the double continuous line passing through the absorption cells from the deacidifying cells to the acidifying cells. In the second phase the mixture is run through the single lines passing through the absorption cells from the acidifying cells to the deacidifying cells. Assuming the system of Fig. 1 is already in operation, the cations A and B to be separated are ionized in a dilute acid solution and fed into cell 1. The acidity of this solution is adjusted to a desired point and then passed into or run through an absorption cell 2 which contains a resin absorber with which an ion exchange from the solution may take place. The acidity of the solution is adjusted in cell 1 so that the following reactions may take place in cell 2:

(1)

where Z represents the substance of the absorber. With the proper adjustment of the acidity, it is possible to obtain a preferential absorption of one of the cations by the absorption from the solution as represented by the equation (2) $$\frac{(AZ)(B^+)}{(BZ)(A^+)} = A > 1$$

so that the solution of the substances to be separated is fractionated by the preferential absorption of the substance A, leaving the absorption material in cell 2 richer in A than the residual solution. To reclaim the A in the residual solution from cell 2 the solution is run into an acidifying cell 3 and from the cell 3 to an absorption cell 4 and through a deacidifying cell 5 into an absorption cell 6 where another preferential absorption takes place. The acidified solution from cell 7 now reverses the reaction of Equation 1 in cell 2 and the residue is passed into the deacidifying cell 8. In the deacidifying cell 8 the acidity obtained in cell 7 is adjusted to be the same as that of cell 1. This deacidified ion-containing solution is then passed into the absorption cell 9 which has been prepared for its reception by acidification with a solution from the cell 13. The reaction of Equation 1 shown occurring in cell 2 is then repeated in cell 9 with a consequent enrichment of A in the portion of the ion-containing solution absorbed, the concentration of A in the absorbed portion being greater than it was in cell 2. To reclaim A in the unabsorbed residual portion of the solution in cell 9 the solution is drawn off into the cell 10 where it is acidified sufficiently to be able to reverse the absorption reaction. After the residual solution from a previous absorption step in cell 6 has been drained into cell 11 the acidified residual solution from cell 10 is passed into cell 6. The acidified solution reverses the absorption process, extracts from the absorber in cell 6, the A and B absorbed from the deacidified ion solution received into cell 6 from cell 5. The composite solution is then drawn off from the cell 6 and deacidified in cell 12 to the proper acidity for the absorption reaction and recycled into cell 2 either through the supply cell 1 or independently. In this flushing out the removal of the A and B is not always complete but is controlled by the factors entering into the absorption reaction.

The absorbed portion in cell 9 is removed by an acid solution from acid cell 13 and through a deacidifying cell 14 is fed into an absorption cell 15 where a repetition of Equation 1 gives the absorbed portion a concentration of A which is even greater than in cell 9. The residual unabsorbed portion of the ion-containing solution of cell 15 is recycled through the acidifying cell 7 and the absorption cell 2 where it picks up the absorbed part of the solution in that cell, thence to the deacidifying cell 8 back to the absorption cell 9 as described above.

To reclaim the A in the residual unabsorbed solution from cell 2, the solution is drawn off into the acidifying cell 3 where it is given an acidity of sufficient concentration to remove from the absorber of the absorption cell 4 the absorbed portion of a previous charge of the ion-containing dilute acid solution. The acidified residual solution is then run from cell 3 to cell 4 where the acidity reverses the reaction of the Equation 1 adding to the residual solution from cell 2 with the absorbed portion of A and B in cell 4. The combined mixture of the acidified residual solution from cell 3 and the portion A and B from cell 4 is then drawn off into the deacidifying cell 5 where the acidity obtained in cell 3 is adjusted to be the same as that in cell 1. This deacidified ion-containing solution is then passed into the absorption cell 6 which has been prepared for its reception by flushing with an acidified solution from cell 10, as described above. The reaction of Equation 1 is then repeated in cell 6 with an enrichment of A in the portion of the solution absorbed over that of the residual solution from cell 2 and the absorbed portion from cell 4. The residual solution from cell 6 is drawn off into a reservoir 11 and reconditioned following which it is led into cell 4 after the acidified solution from cell 3 is removed from the cell 4.

The continuous process cycles the A-enriched solution upward and the A-impoverished solution downwards, concentrating A in the upper cells and concentrating B in the lower cells. The separated constituents of the mixture may be removed from the system by simply drawing off a portion of the material at the respective ends. The separated mixture may also be taken from the system at either end by the removal reaction in the respective end absorption cells 15 and 4 of the acidifying and deacidifying agents. The amount of removal of the solution with A-concentration from cell 15 may be regulated by the acidity of the solution introduced from cell 16 for flushing the cell 15. The acidity of this solution from cell 16 determines the extent to which the reaction of Equation 1 is reversed and consequently the amount of A-concentrate going into solution to be removed. Similarly the removal of the B-concentrate from the system through cell 4 is regulated by the acidity of the solution introduced from cell 11.

The cycling may be repeated for any number of cells, depending upon the concentration desired and the degree of concentration obtained in each cycle. In the system illustrated the fresh supply is fed in near the center of the series of absorption cells and the concentrates drawn off at the opposite ends. In this way, a concentration is obtained of both the components of A and B and material is saved which would otherwise be rejected with a very small part of the valuable constituent removed. Where a different concentration is desired, such as A alone, the fresh supply may be introduced at the bottom absorption cell, or if the concentration were to be of B alone the fresh supply would be introduced at the top absorption cell and the concentrate drawn off at the opposite end.

For the purposes of this description of the process, the passage of the deacidifying solution through the absorption cells has been described as divided into two steps. The first in which the deacidified solution is run into the absorption cells and the second in which the residual solution not reacting into the absorption material is drawn off from the cell. In some instances it would be preferable to flow the deacidified solution through the absorption cells and into the acidifying cells without holding it in the absorption cells. In this case the same reaction of the Equation 1 will take place as the solution flows through the absorption cells and the residual solution is drawn off into the acidifying cells. By means of this continuous flow the differential absorption action of the absorber may be greater than if the mixture to be separated is reacted in the absorption cell in batches. Likewise, passing the acidified solution in a continuous flow through the absorption cells for flushing may be advantageous over flushing the absorption cells by a batch operation.

For the purpose of providing a clear understanding of this invention but without imposing limitation thereon, it will be described with more particular reference to the concentration of radium and barium. A solution of barium and radium is obtained by dissolving the chlorides of radium-containing barium in .128 molar hydrochloric acid. Referring to a system of cells shown in Fig. 2, the absorption cells 23, 26, 30 and 33 contain an ion-exchange resin known as "ZeoKarb H" for absorbing solution and the acidifying cells 24, 28, 31 and 34 adjust the acidity to 2.00 molar to hydrochloric acid while the cells 21, 25, 29, 32 and 35 deacidify the solution to .128 normal hydrochloric acid. "ZeoKarb H" is, a trademark of the Permutit Company, an organic cation exchanger of the sulphonated coal derivative type. The dilute solution of barium and radium is passed into the absorption cell 22 where a part of the radium and barium ions are absorbed from the solution by ion-exchange with a greater proportion of the radium being absorbed than the barium. The residual portion of the barium radium solution is then drained from the absorption cell 22 into tank 23 and then a solution 2.00 molar hydrochloric acid from cell 24 is flushed through the absorption cell 22 dissolving out most of the barium and radium from the "ZeoKarb H" with the proportion of radium increased and carrying it through to the deacidifying cell 25 where it is reduced in acidity to a .128 molar solution. The deacidified solution is then passed into a "ZeoKarb H" absorption cell 26 where the process of ion exchange is repeated with a still greater proportion of the radium again being absorbed. The cell 26 is flushed with a solution 2.00 molar to hydrochloric acid from cell 28 removing the absorbed radium and barium and is deacidified in cell 29 for the absorption reaction in cell 30. The residual solution from cell 30 is run into the cell 22 through acidifying cell 24, the absorbed radium and barium from a subsequent step flushed out of the absorber in cell 22 and passed to a deacidifying cell 25 and then to the "ZeoKarb H" cell 26, thus repeating the step with the addition of the unabsorbed portion from cell 30. The unabsorbed solution from the absorption cell 26 is passed to a tank 27. This proces may be repeated for any number of cells to give the desired concentration of radium in the barium drawing off the radium concentrate from the highest absorption cell. It is shown here repeated for two more cycles through absorption cells 33 and 36.

The following example serves to illustrate the process:

25 cubic centimeter samples of a solution of radium and barium in .128 hydrochloric acid were run through a series of five "ZeoKarb H" absorption cells each containing 2.1 cc. of "ZeoKarb H." The samples were cycled through the five cells for a total of six cycles. The cells were flushed with 2.00 molar hydrochloric acid and the flushing was deacidified to .128 molar solution before passing into the next absorption cell. The reject was carried down through a reject tank.

Analysis was made for the amount of barium and for the radium-barium ratio in the final absorption cell and in each deacidifying cell and in the reject tank. Two analyses were made of the reject tank, one at the completion of the first cycle when the reject tank contained the unprocessed solution and again at the completion of the six cycles. The barium analyses were by conductivity measurement and the radium analyses by radioactive counting. The analyses showed that the processing of the solution increased the proportion of radium in the barium. The ratio of the Ra/Ba in reject tank at the end of 6 cycles to the Ra/Ba in the original solution was almost 1:1. This proportion was found to gradually increase through the five stages so that the ratio of the Ra/Ba in the final solution to the Ra/Ba in the original solution was 1.54:1.

As a demonstration of the relative concentration of radium in the above described system of Fig. 2, the following continuous process is set forth:

Status: Steady state operation
  In cell 21—Supply to be fractionated
  In cell 24—10,000 micromoles barium and 1.00 micromole radium in 1 liter 2 molar HCl
  In cell 28—10,000 micromoles barium and 1.05 micromoles radium in 1 liter 2 molar HCl
  In step 31—10,000 micromoles barium and 1.10 micromoles radium in 1 liter 2 molar HCl
  In cell 34—2 molar HCl

*Step 1.*—1 liter of a solution from cell 21 containing 21,000 micromoles barium and 2.00 micromoles radium as chlorides in 0.128 molar HCl is passed into cell 22. 11,000 micromoles barium and 1.10 micromoles radium are sorbed in cell 22; the solution with 10,000 micromoles barium and 0.90 micromole radium passes out into tank 23. It may subsequently be further stripped if desired.

Status: In cell 22—11,000 micromoles barium and 1.10 micromoles radium

*Step 2.*—1 liter of a 2 molar HCl solution from cell 24 containing 10,000 micromoles barium and 1.00 micromole radium is flushed through cell 22 into cell 25 leaching out the metals from cell 22.

Status:
  In cell 22—no metals
  In cell 25—21,000 micromoles barium and 2.10 micromoles radium in 1 liter 2 molar HCl

*Step 3.*—By passage through an acid sorber or a spray tower or the like, the solution in cell 25 is deacidified to 0.128 molar HCl.

Status: In cell 25—21,000 micromoles barium and 2.10 micromoles radium in 1 liter 0.128 molar HCl

*Step 4.*—Solution from cell 25 is passed through cell 26 where 11,100 micromoles barium and 1.15 micromoles radium are sorbed; the solution with 10,000 micromoles barium and 0.95 micromole radium passes out into tank 27. It may subsequently be further stripped if desired.

Status: In cell 26—11,100 micromoles barium and 1.15 micromoles radium

*Step 5.*—1 liter of a 2 molar HCl solution from cell 28 containing 10,000 micromoles barium and 1.05 micromoles radium is flushed through cell 26 into cell 29 leaching out the metals from cell 26.

Status:
  In cell 26—no metals
  In cell 29—21,100 micromoles barium and 2.20 micromoles radium in 1 liter 2 molar HCl

*Step 6.*—Solution in cell 29 is deacidified to 0.128 molar HCl.

Status: In cell 29—21,100 micromoles barium and 2.20 micromoles radium in 1 liter 0.128 molar HCl

*Step 7.*—Solution from cell 29 is passed through cell 30 where 11,100 micromoles barium and 1.20 micromoles radium are sorbed; the solution with 10,000 micromoles barium and 1.00 micromole radium passes into cell 24.

Status:
  In cell 30—11,100 micromoles barium and 1.20 micromoles radium
  In cell 24—10,000 micromoles barium and 1.00 micromole radium in 1 liter 0.128 molar HCl

*Step 8.*—HCl is added to solution in cell 24 to acidify it to 2 molar.

Status: In cell 24—10,000 micromoles barium and 1.00 micromole radium in 1 liter 2 molar HCl

*Step 9.*—1 liter of a 2 molar HCl solution from cell 31 containing 10,000 micromoles barium and 1.10 micromoles radium is flushed through cell 30 into cell 32 leaching out the metals from cell 30.

Status:
  In cell 30—no metals
  In cell 32—21,100 micromoles barium and 2.30 micromoles radium in 1 liter 2 molar HCl

*Step 10.*—Solution in cell 32 is deacidified to 0.128 molar HCl.

Status: In cell 32—21,000 micromoles barium and 2.30 micromoles radium in 1 liter 0.128 molar HCl

*Step 11.*—Solution from cell 32 is passed through cell 33 where 11,100 micromoles barium and 1.25 micromoles radium are sorbed; the solution with 10,000 micromoles barium and 1.05 micromoles radium passes into cell 28.

*Step 12.*—HCl is added to solution in cell 28 to acidify it to 2 molar.

Status:
  In cell 33—11,100 micromoles barium and 1.25 micromoles radium
  In cell 28—10,000 micromoles barium and 1.05 micromoles radium in 1 liter 2 molar HCl

*Step 13.*—1 liter of 2 molar HCl from reservoir 34 is flushed through cell 33 into cell 35 leaching out the metals from cell 33.

*Step 14.*—Solution in cell 35 is deacidified to 0.128 molar HCl

Status:
  In cell 33—no metals
  In cell 35—11,000 micromoles barium and 1.25 micromoles radium in 1 liter 0.128 molar HCl

*Step 15.*—Solution in cell 35 is passed through cell 36 into cell 31. 1100 micromoles barium and 0.15 micromoles radium remain in cell 36; 10,000 micromoles barium and 1.10 micromoles radium pass on in the solution into cell 31.

*Step 16.*—HCl is added to solution in cell 31 to acidify it to 2 molar

Status:
  In cell 31—10,000 micromoles barium and 1.10 micromoles radium in 1 liter 2 molar HCl
  In cell 36—1100 micromoles barium and 0.15 micromoles radium

*Step 17.*—100 ml 2 molar HCl is put through cell 36 to remove 1100 micromoles barium and 0.15 micromoles radium as a radium concentrate.

*Overall balance*

Status of cells—same as before Step 1:
  In cell 21—Supply to be fractionated
  In cell 24—10,000 micromoles barium and 1.00 micromoles radium in 1 liter 2 molar HCl
  In cell 28—10,000 micromoles barium and 1.05 micromoles radium in 1 liter 2 molar HCl
  In cell 31—10,000 micromoles barium and 1.10 micromoles radium in 1 liter 2 molar HCl
  In cell 34—2 molar HCl

*Supplied to cell system*

Step 1.—1 liter with 21,000 micromoles barium and 2 micromoles radium
Step 13.—1 liter
Step 17.—0.1 liter Total —2.1 liter with 21,100 micromoles barium and 2 micromoles radium

*Removed from cell system*

Step 1.—1 liter with 10,000 micromoles barium and 0.90 micromoles radium

Step 4.—1 liter with 1,100 micromoles barium and 0.95 micromoles radium

Step 17.—0.1 liter with 1,100 micromoles barium and 0.15 micromoles radium

Total —2.1 liter with 21,100 micromoles barium and 2.00 micromoles radium

In Step 1 the solution is depleted in radium and in Step 17 the radium is accumulated to a concentration over 40% above the initial concentration. The process is a continuous countercurrent reflux operation and thus avoids the main disadvantage of power operation which is limited to the production of only a small amount of concentrate after which the tower must be completely eluted and the batch treatment repeated.

Another suitable separation method of the invention is the selective absorption of a gas at a low temperature followed by drawing off the residual gas and the release of the absorbed gas from the absorber by a heated gas. Applying this method to the Fig. 1 the cells 4, 6, 2, 9 and 15 are absorption cells containing a substance such as silica gel which has the property of absorbing certain gases in preference to others at some temperature. The cells 5, 12, 1, 8 and 14 are cooling cells which are capable of cooling a mixture of gases so that when passed into the absorption cells 4, 6, 2, 9 and 15 the temperature for preferential absorption will be obtained. The cells 3, 10, 7 and 13 are heating cells capable of raising a gas to a temperature that will release absorbed gases when passed through cells 4, 6, 2, 9 and 15. Cells 11 and 16 temperature condition the flushing gases so desired production control is maintained.

Assuming the system to be in operation the continuous flow of gas through the cells shown by the arrowed lines is divided into two phases, the double line representing the charging of absorption cell phase, and the single continuous line the scavenging phase. All the lines of the same phase are operated simultaneously. The gas mixtures in cells 5, 12, 1, 8 and 14 are cooled to a temperature which will give the desired selective absorption properties with the absorber and in the double line phase the cooled mixtures are led into the absorption cells as shown in Fig. 1. The absorption cells 4, 6, 2, 9 and 15 contain an absorber and at the temperature attained in the cell the absorber takes up the gases absorbing the desired gas preferentially and leaving the unabsorbed residue relatively poorer in the content of the desired gas. The unabsorbed residues are drawn off from the absorption cells 2, 9 and 15 into the heating cells 3, 10 and 7 respectively. The residue from cell 6 is drawn into conditioning cell 11 and the residue from cell 4 is withdrawn as product or discarded.

The unabsorbed residues in heating cells 3, 10 and 7 are raised in temperature to the point where they will release the absorbed gases from the absorbent when passed into the absorbing cells. In the single line phase the heated gases in cells 3, 10, 7, 13 and 16 are run into the absorption cells 4, 6, 2, 9 and 15 respectively and after the absorbed gases from the preceding double line phase are released the mixture is passed onto the cooling cells 5, 12, 8 and 14 respectively. The product of cell 15 is flushed from the system on this step and collected for use. The cycle is then repeated starting with the cooling in the cooling cells, charging the absorption cells, drawing off the residue, heating in the heating cells and flushing. The gas removed from the system through cells 4 and 15 is replaced by a fresh mixture to be separated through the cooling cell 1 into cell 2.

The concentration of the desired gas in the mixture becomes greater as it progresses upward through the cells but the smaller proportions of the desired gas in the unabsorbed residue are not lost but are recirculated. The system can be made up of any number of stages and the new mixture can be fed in at any point but concentration is substantially increased only upon progression away from the point of introduction.

An example of the separation of a gas or gases by heating and cooling may be seen in the separation of the sulphur isotopes $S^{32}$ and $S^{34}$ in $SO_2$.

The sulphur of $SO_2$ is normally made up primarily of $S^{32}$ and $S^{34}$ isotope. The $S^{34}$ may be separated from the $S^{32}$ by preferential absorption in silica gel. Referring again to Fig. 1 the absorption cells 4, 6, 2, 9 and 15 contain silica gel and the gas mixture passed through the system contains 6% $SO_2$ by weight with the remainder $N_2$. The gas mixture is cooled to $-10°$ C. in the cooling cells 5, 12, 8 and 14 to bring the overall temperature in the absorption cells during the flushing phase to $100°$ C.

Assuming the $S^{34}$ to be the isotope preferentially absorbed in the silica gel over the $S^{32}$, the $S^{34}$ is concentrated upward toward cell 15 in the system shown in Fig. 1. The $SO_2$ absorbed in cell 15 is extracted by a hot gas from cell 16 and removed for further processing. The $S^{32}$ is concentrated downward and removed from the cell 4 as the unabsorbed residue. If the $S^{32}$ is the isotope preferentially absorbed the direction of concentration of $S^{32}$ and $S^{34}$ are reversed.

Broadly, the method includes: selective absorption of a portion of the ions in a through-going solution by an exchange cell, and regeneration of the cell by the acidified output solution of a previous cell. These two steps make up a cycle which is repeated over and over in every cell to accommodate the advancing solution. With proper direction of the solution through a bank of cells and suitable conditioning of the solution through a bank of cells and suitable conditioning of the solution in its passage, countercurrent progression of the separated fractions is continuous from the charge point to the final withdrawal points on the system. Thus the system is analogous to a rectifying column. The example outlined below is based on the use of a cation-exchanger with hydrogen ions as convenient regenerating ions, but the method may be employed with any type of ion-exchanger with any suitable ion for regeneration.

In the foregoing discussion concentrations of forms of the ion-exchanger, indicated by HZ, AZ, and BZ, are given in moles available for exchange per bulk liter of the ion-exchange material. This arbitrary choice was made for its convenience as well as for its similarity to conventional concentration units.

Figure 3:
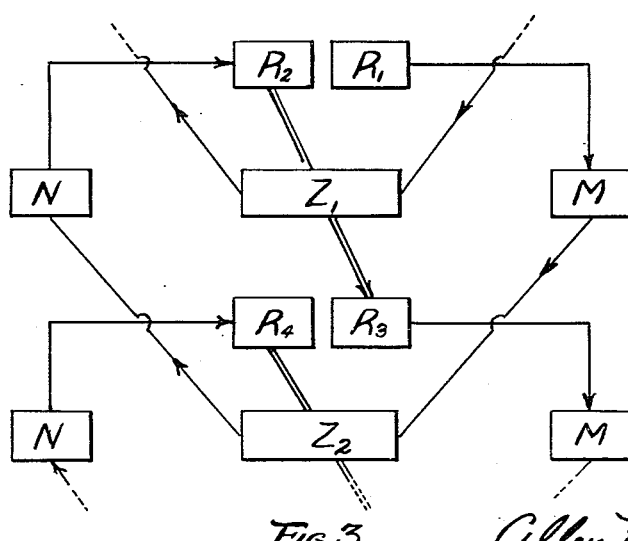

A schematic diagram of a system for compounding the simple fractionation is shown in Figure 3. Fig. 3 is a further explanatory flow diagram showing progressive staging of unit absorbers in accordance with this invention, in which R is a reservoir, Z an ion-exchange cell, M an acidifier and N a deacidifier.

The system is valved so that the flow of solutions alternates between the double and single lines. Thus if $$\frac{(AZ)(B^+)}{(BZ)(A^+)} = a > 1$$

following the double line, the material in $R_2$ goes through one fractionation stage, leaving in $Z_1$ material richer in A and in $R_3$ material richer in B. Following the single line the material in $R_3$ is acidified and collects much of the A-enriched material from $Z_3$ (not shown). This solution then passes through a system in which the acidity is reduced so that the two solutes may experience selective absorption in $Z_2$. In this manner, A-enriched material is constantly being moved up and B-enriched material down with progressive separation. The concentrates may be drawn off at suitable points and supply furnished at a central position of a bank of cells with the arrangement necessary to a suitable material balance. Normally, the ideal arrangement would entail the exchanger's absorbing about half the ions to be separated on the first step (double lines) and releasing them all on the succeeding step (single lines), giving maximum throughput.

Using the behavior of tested samples as a guide for process design, a fractionating system conforming to the specifications of Figure 4 includes five cells, each containing 2.1 cc. of ZeoKarb H, was set up.

Fig. 4 is a flow diagram of a further developed fractionating system, in which A—E are cells of 2.1 cc. of ZeoKarb each, S is a reservoir of 2.00 molar HCl, and X is a reservoir of solution.

HCl, 0.130 molar
$BaCl_2$, 0.046 molar
$RaCl_2$, $0.104 \times 10^{-8}$ molar

A solution of radium and barium chlorides was made 0.13 molar in hydrochloric acid (solution X). A solution 2.0 molar in hydrochloric acid was used for regenerations. For simplicity, "deacidification" was accomplished by evaporation to dryness and subsequent solution of the residue in 0.13 molar hydrochloric acid. In commercial operation various acid-absorbers might be of practical value for this deacidification step.

To start operation, a 25-cc. sample of solution X was first poured through each cell at a uniform rate, requiring 30 seconds for the passage. As subsequent analysis showed, the portion of the solute mixture absorbed (about 43%) contained a higher ratio of radium to barium than that passing through. As diagrammed in Fig. 4, the throughput portions were then acidified and passed through succeeding cells (dotted lines) collecting most of the previously absorbed solute. The solutions were then deacidified so that selective absorption could again take place on the next passage (solid lines); and the process was continued progressively. After six absorption-regeneration cycles it was assumed that a steady state was nearly reached, and operation was discontinued. A 25 cc. sample of 2 N hydrochloric acid was then flushed through A and the effluent solution analyzed. The barium analyses, as in the previous samples, were made by conductivity measurements; the radium analyses were made by $\gamma$-ray counting—the overall probable error was about 3%. The metallic ion throughput became less and less toward the end of the series; this was due to greater absorption than was anticipated in the cells.

A calculation of the expected ($Ra^{++}$) for the analyzed ($Ba^{++}$) in each solution was made for different values of $a$. A value of $a=1.22$ gave good agreement with experimental results.

The continuous recycle method of this invention provides a process for separating components of a mixture by a cascading of separatory steps without losing an appreciable portion of the substance or substances sought to be recovered. By refluxing the discarded unseparated portions of the mixture a large part of the desired substance is saved from disposal as waste. A concentration of the desired substance in the otherwise discarded portion provides for its return into the concentrated portion of the system and eventual recovery.

Thus the process of this invention is a cascading system in which the concentration is not obtained by a decrease in the amount of the treated substance in the repeated steps of separation. The concentration of the desired substance is increased in an equal quantity of treated substance.

A wide range of substances may be separated from each other by the above process and while specific examples have been illustrated there are other systems for obtaining concentration through recycling. A range in the degree of purification is also possible by selecting the point of removal. It will be understood that various modifications can be made without departing from the principles of the invention as disclosed. For example, an auxiliary heating of the gas absorber material might be preferable as an addition to or entirely replacing the external reservoir heating of the example.

I claim:

1. In a process for progressively varying the relative proportions of constituents A, B of a fluid mixture AB in a series $a, b, c, d$, of separation treatment stages, each stage comprising a conditioning treatment and a separation treatment, the steps comprising pre-conditioning said mixture to respond to the action of an agent adapted to separate and retain a portion of the mixture, subjecting said pre-conditioned mixture to the action of said agent in a stage $a$ to separate out and retain a portion of said constituents A, B in which the amount of constituent B is reduced relative to constituent A and so that the residual unretained portion of said mixture correspondingly has constituent A relatively decreased with respect to constituent B, subjecting said residual unretained portion from stage $a$ to the conditioning treatment of stage $c$ serially two positions further along in the system and applying the said portion so conditioned to materal previously separated and retained as a mixture of constituents A and B at said stage $c$ to remove said material therefrom conditioning the resultant mixture of constituents A and B for separation and retention in stage $b$ between stages $a$ and $c$ and subjecting said mixture to said separation and retention by an agent in stage $b$ to separate out and retain a portion of said mixture constituents A, B in which the amount of constituent B is reduced relative to constituent A and so that the residual unretained portion of said mixture correspondingly has constituent A further relatively decreased with respect to constituent B, subjecting said residual unretained portion from stage $b$ to the conditioning of stage $d$ two positions further along the system, applying said portion so conditioned to material previously separated and retained as a mixture of constituents A and B at said stage $d$ to remove said material therefrom, conditioning the resultant mixture of constituents A and B for separation and retention treatment in stage $c$ between stages $b$ and $d$, and subjecting said mixture so conditioned to said separation and retention treatment by an agent in said stage $c$ to separate and retain a portion of said mixture of constituents A, B in which the amount of constituent B is reduced relative to constituent A and so that the residual unretained portion of said mixture correspondingly has constituent A further relatively decreased with respect to constituent B, said sequences of conditioning and treatment being repeated to desired relative proportioning of constituents A and B.

2. In a continuous process for varying the relative proportion of constituents in a fluid mixture A, B in a system of successive absorption stage $a, b, c, d$, resin absorbers, the steps comprising preconditioning said mixture to respond to the action of an ion-exchange adapted to absorb a portion of the mixture, subjecting said preconditioned mixture to the action of said ion-exchange resin absorber in a stage $a$ to separate out and retain a portion of said constituents A, B in which the amount of constituent B is reduced relative to constituent A and so that the residual unretained portion of said mixture correspondingly has constituent A relatively decreased with respect to constituent B, subjecting said residual unabsorbed portion from stage $a$ to the conditioning treatment of stage $c$ serially two positions further along in the system and applying the said portions so conditioned to material previously absorbed by ion-exchange as a mixture of constituents A and B at said stage $c$ to remove said material therefrom conditioning the resultant mixture of constituents A and B for ion-exchange absorption treatment in stage $b$ between stage $a$ and $c$ and subjecting said mixture so conditioned to said absorption treatment by an ion-exchange resin absorber in stage $b$ to absorb a portion of said mixture constituents A, B in which the amount of constituent B is reduced relative to constituent A and so that the residual unretained portion of said mixture correspondingly has constituent A further relatively decreased with respect to constituent B, subjecting said residual unabsorbed portion from stage $b$ to the conditioning of stage $d$ two positions further along the system, applying said portion so conditioned to material previously absorbed as a mixture of constituents A and B by an ion-exchange resin at said stage $d$ to remove said material therefrom, conditioning the resultant mixture of constituents A and B for absorption treatment in stage $c$ between stages $b$ and $d$, and subjecting said mixture so conditioned to said absorption and retention treatment by an ion-exchange resin absorber in said stage $c$ to absorb a portion of said mixture of constituents A, B, in which the amount of constituent B is reduced relative to constituent A and so that the residual unabsorbed portion of said mixture correspondingly has constituent A further relatively decreased with respect to constituent B, said sequences of conditioning and absorption treatment being repeated to desired relative proportioning of constituents A and B.

References Cited in the file of this patent

UNITED STATES PATENTS

| | | |
|---|---|---|
| 2,204,072 | Dean | June 11, 1940 |
| 2,387,898 | Grebe et al. | Oct. 30, 1945 |
| 2,435,796 | Reid | Feb. 10, 1948 |

OTHER REFERENCES

Smyth: A General Account of the Development of Methods of Using Atomic Energy, 1940–1945, pages 121 and 122. Zeitschrift fur Physik, vol. 79, pp. 108–121 (1932) Hertz.